(12) United States Patent
Aida et al.

(10) Patent No.: US 6,650,792 B1
(45) Date of Patent: Nov. 18, 2003

(54) IMAGE PROCESSOR

(75) Inventors: Toru Aida, Kanagawa-ken (JP); Masamichi Nakajima, Kanagawa-ken (JP); Masayuki Kobayashi, Kanagawa-ken (JP); Junichi Onodera, Kanagawa-ken (JP); Hideyuki Ohmori, Kanagawa-ken (JP)

(73) Assignee: Fujitsu General Limited, Kawasaki (JP)

( * ) Notice: Subject to any disclaimer, the term of this patent is extended or adjusted under 35 U.S.C. 154(b) by 0 days.

(21) Appl. No.: 09/600,108
(22) PCT Filed: Mar. 31, 1999
(86) PCT No.: PCT/JP99/01652
§ 371 (c)(1), (2), (4) Date: Jul. 6, 2000
(87) PCT Pub. No.: WO00/28728
PCT Pub. Date: May 18, 2000

(30) Foreign Application Priority Data

Nov. 10, 1998 (JP) ............................................. 10-319644

(51) Int. Cl.7 ............................. G06K 9/32; G06K 9/40; H04N 5/217; G09G 5/00
(52) U.S. Cl. ...................... 382/298; 382/299; 382/295; 382/260; 382/266; 348/625; 348/606; 345/618; 345/611
(58) Field of Search ............................... 382/255, 256, 382/260, 261, 263, 264, 266, 268, 269, 275, 293, 295, 298, 299, 309; 348/606, 625, 628, 629; 345/611, 613, 616, 618, 631, 660; 358/3.15, 3.26, 3.27, 501, 512, 518, 528, 532, 537, 451, 463

(56) References Cited

U.S. PATENT DOCUMENTS

| | | | | |
|---|---|---|---|---|
| 4,706,113 A | * | 11/1987 | Ito et al. ........................ | 358/37 |
| 4,903,121 A | * | 2/1990 | Uomori et al. ................. | 358/41 |
| 5,475,507 A | * | 12/1995 | Suzuki et al. ................. | 358/500 |
| 5,649,031 A | * | 7/1997 | Nakamura et al. ........... | 382/254 |
| 5,850,487 A | * | 12/1998 | Takane et al. ............... | 382/298 |
| 5,892,551 A | * | 4/1999 | Uematsu ....................... | 348/447 |
| 6,148,116 A | * | 11/2000 | Park et al. ................... | 382/266 |

* cited by examiner

Primary Examiner—Bhavesh M. Mehta
Assistant Examiner—Yosef Kassa
(74) Attorney, Agent, or Firm—Flynn, Thiel, Boutell & Tanis, P.C.

(57) ABSTRACT

An image processor containing an EPROM (38) stored with coefficient data for image enlargement and reduction, coefficient read controllers (40–44) for reading out coefficient data from the EPROM (38) according to an enlargement/reduction selection signal, a variable horizontal characteristic filter (16) for executing either image enlargement or image reduction according to the coefficient data, a variable vertical characteristic filter (18) also for executing either image enlargement or image reduction according to the coefficient data, a frame memory (20), a contour correcting circuit (14), and selectors (22–30). When image enlargement is selected by selectors (22–30), input video signals are processed by the contour correcting circuit (14), the frame memory (20), and the filters (16,18) in this order while, when image reduction is selected, input video signals are processed by the same in the reverse order. The portion which should not undergo contour enhancement does not undergo contour enhancement during image enlargement, and high frequency components enhanced by contour correction during image reduction do not disappear and adequate contour correction, even when either processing image enlargement or reduction, is selected.

5 Claims, 9 Drawing Sheets

Fig. 3

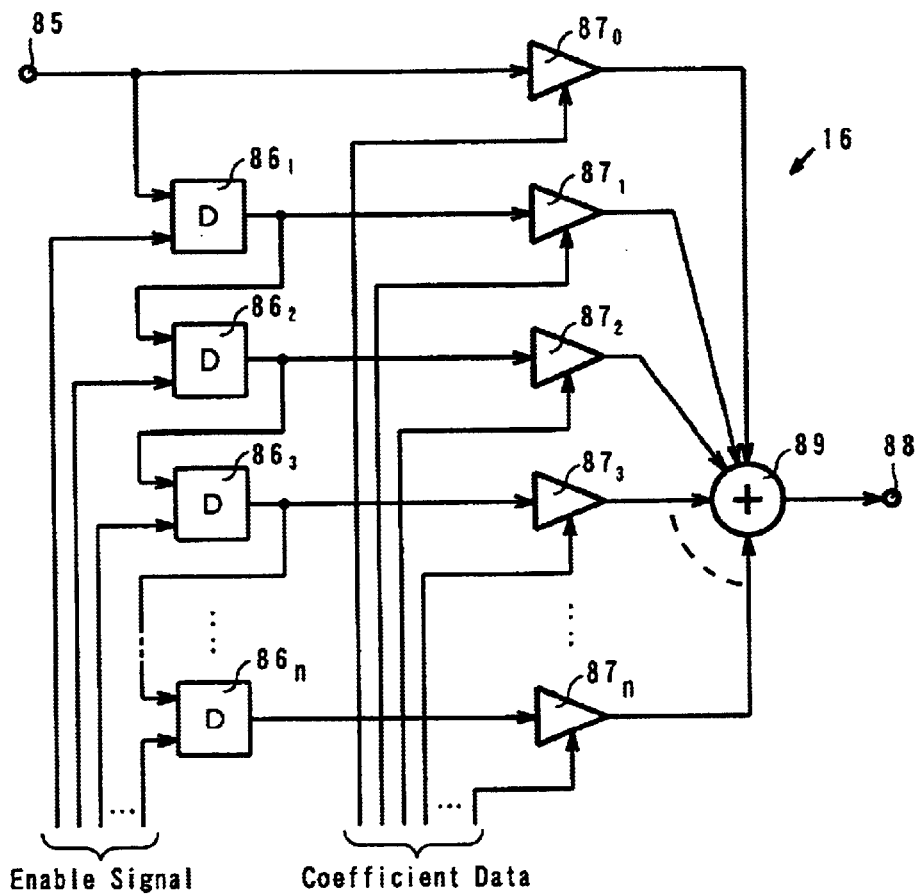

Fig. 4

| Selection of Enlargement/ Redution | Enlargement/ Reduction Selction Signal (2bit) | Selection of 1st-4th Selector | Decoder Output | Selection of 5th and 6th Selector |
|---|---|---|---|---|
| ① Vertical Reduction / Horizontal Reduction | 0 0 | A | L | A |
| ② Vertical Reduction / Horizontal Enlargement | 0 1 | B | L | A |
| ③ Vertical Enlargement / Horizontal Reduction | 1 0 | C | L | A |
| ④ Vertical Enlargement / Horizontal Enlargement | 1 1 | D | H | B |

Fig. 5
(a) ①Vertical Reduction・Horizontal Reduction
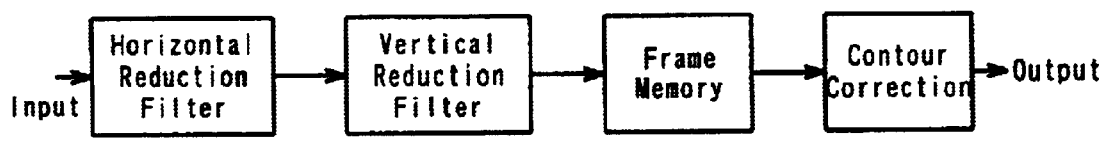
(b) ②Vertical Reduction・Horizontal Enlargement
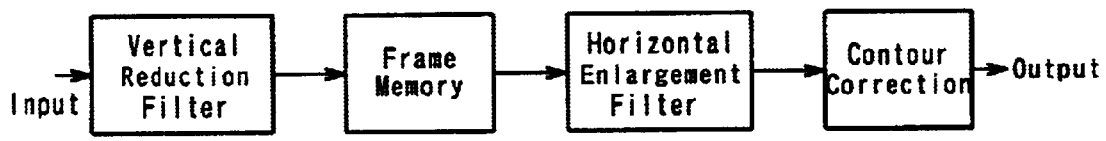
(c) ③Vertical Enlargement・Horizontal Reduction
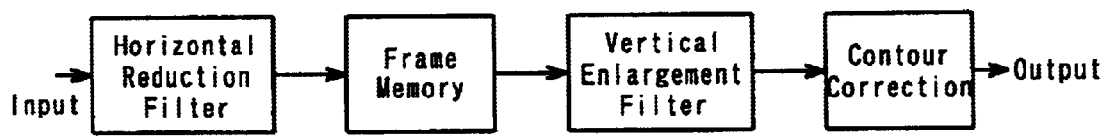
(d) ④Vertical Enlargement・Horizontal Enlargement
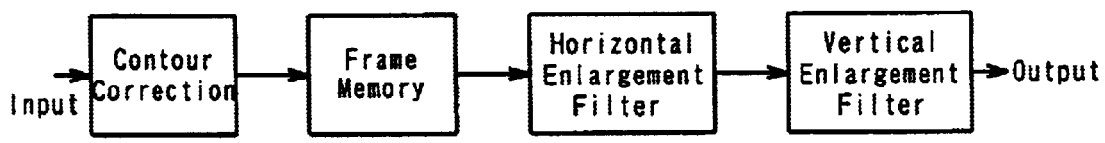

Fig. 7
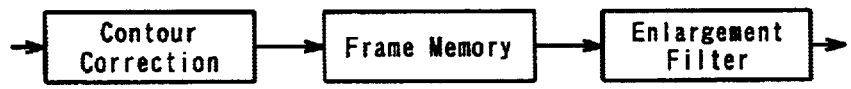
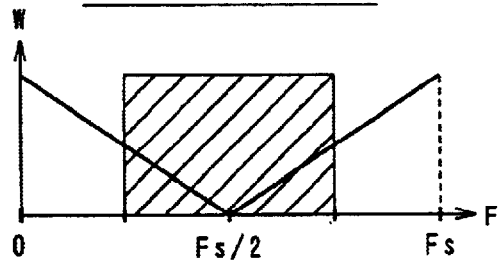
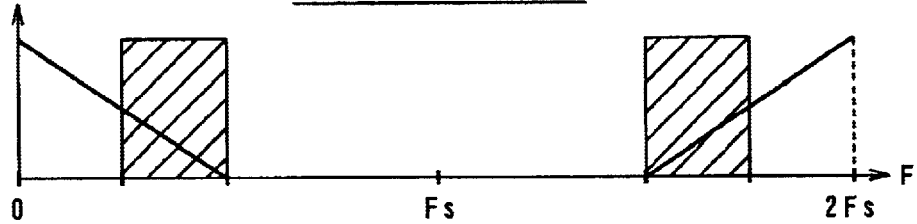
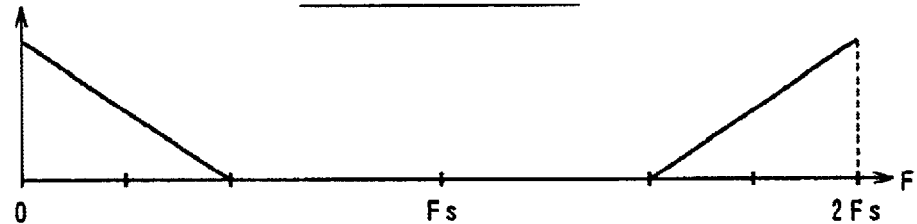
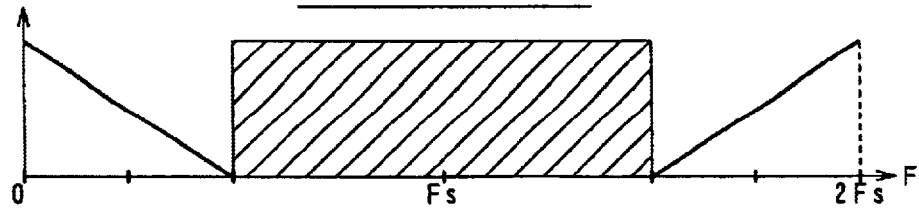

Fig. 9

| Selection of Enlargement/ Redution | | Enlargement/ Reduction Selction Signal (2bit) | Selection of 1st-4th Selector | Decoder Output | Selection of 5th and 6th Selector |
|---|---|---|---|---|---|
| ① | Vertical Reduction<br>Horizontal Reduction | 0 0 | A | L | A |
| ② | Vertical Reduction<br>Horizontal Enlargement | 0 1 | B | H | B |
| ③ | Vertical Enlargement<br>Horizontal Reduction | 1 0 | C | H | B |
| ④ | Vertical Enlargement<br>Horizontal Enlargement | 1 1 | D | H | B |

Fig. 10
(a) ① Vertical Reduction · Horizontal Reduction
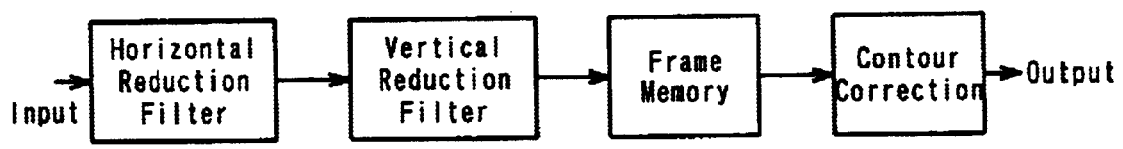
(b) ② Vertical Reduction · Horizontal Enlargement
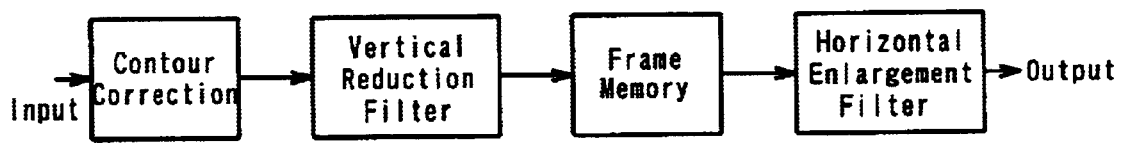
(c) ③ Vertical Enlargement · Horizontal Reduction
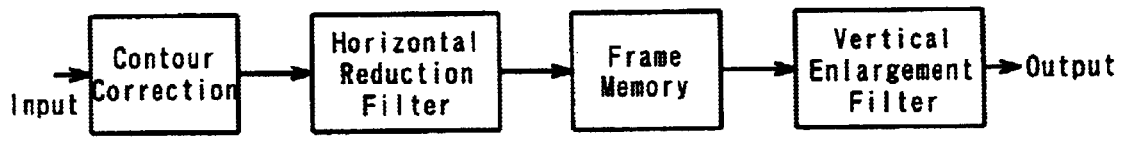
(d) ④ Vertical Enlargement · Horizontal Enlargement

IMAGE PROCESSOR

TECHNICAL FIELD

The present invention relates to an image processor designed for either image enlargement processing or image reduction processing or the both or contour correction.

BACKGROUND ART

It is a common practice for conventional image processors to execute the image processing in the order of the contour correction to input video signal and subsequent image enlargement processing and/or image reduction processing, or in the order of the image enlargement processing and/or image reduction processing and subsequent contour correction.

In other words, the contour correction is not correlated with the image enlargement processing and/or image reduction processing.

Further, as discussed above, in a conventional image processor, the contour correction is not correlated with the image enlargement processing and/or image reduction processing, causing a problem such as very poor contour correction effect or unnecessary contour emphasis.

For instance, in a system designed for making the contour correction subsequently to the image enlargement processing to the input video signal, the contour correction is made to the video signal subsequently to the image enlargement processing, causing a problem such as making unnecessary emphasizing of contour.

Further, in a system designed for executing the image reduction processing subsequently to the image reduction processing for input video signal, the band of the high-pass frequency component intensified by the contour emphasizing is limited in the stage of image reduction processing, thereby causing a problem that very poor contour correction effect results.

The present invention is made in consideration of the above problems and is designed to provide an image processor that is not only capable of freely selecting either the image enlargement processing or image reduction processing but also capable of making appropriate contour correction regardless of whether the image enlargement processing or image reduction processing is selected.

DISCLOSURE OF THE INVENTION

The image processor according to the present invention comprises a coefficient memory for previously storing the coefficients for image enlargement and image reduction, a coefficient read-out controller for reading out corresponding coefficient from the coefficient memory according to enlargement/reduction selection signal, a characteristic variable filter for executing the filter processing corresponding to either image enlargement or image reduction according to the coefficient data read out by the coefficient read-out controller, an image memory and a contour correction circuit and selector groups, the selector groups being respectively provided in the preceding and subsequent stages of each of the image memory, the contour correction circuit and the characteristic variable filter and connected to one another.

When the image enlargement processing is selected by the enlargement/reduction selection signal, the selector groups makes the input video signal being processed sequentially through the contour selection circuit, image memory and characteristic variable filter, while the video signal is made to be processed sequentially through the characteristic variable filter, image memory and contour correction circuit when the enlargement/reduction selection signal for image reduction processing is selected.

When the image enlargement processing is selected, the input video signal is made to be processed sequentially through the contour correction circuit, image memory and characteristic variable filter. In this case, the characteristic variable filter executes the filter processing for image enlargement according to the coefficient data read out from the coefficient memory in response to the enlargement/reduction selection signal. In this case, since the image enlargement processing is executed after the contour correction, unnecessary emphasizing of contour can be prevented unlike the case of the conventional system wherein the contour correction processing is applied to the video signal which has already undergone the image enlargement processing.

When the image reduction processing is selected, the input video signal is processed sequentially through the characteristic variable filter, image memory and the contour correction circuit. In this case, the characteristic variable filter executes the filter processing for image reduction according to the coefficient data for the image reduction read out from the coefficient memory in response to the enlargement/reduction selection signal. In this case, since the contour correction is made after the image reduction processing, the band of the high-pass frequency component will not be limited for the image reduction processing unlike the case of the conventional system.

Further, in the image processor according to the present invention, the coefficient memory previously stores the coefficient data for image enlargement and image reduction in horizontal direction and vertical direction respectively; the coefficient read-out controller reads out the corresponding coefficient data from the coefficient memory according to the enlargement/reduction selection signal for selecting either image enlargement processing or image reduction processing with respect to each of the horizontal direction and vertical direction; the characteristic variable filter comprises a horizontal characteristic variable filter, for executing the filter processing for either the image enlargement processing or image reduction processing in horizontal direction according to the coefficient data for horizontal direction read out by the coefficient read-out controller, and a vertical characteristic variable filter for executing the filter processing for either the image enlargement processing or image reduction processing in vertical direction according to the coefficient data for vertical direction read out by the coefficient read-out controller.

With the arrangement described above, either the image enlargement processing or image reduction processing, each with respect to either horizontal direction (transverse direction) or vertical direction (perpendicular direction) can be selected freely.

In the image processor according to the present invention, when the vertical reduction and horizontal reduction are selected by the selector groups, processing proceeds sequentially through the horizontal characteristic variable filter, vertical characteristic variable filter, image memory and contour correction circuit; when the vertical reduction and horizontal enlargement are selected, the processing proceeds sequentially through the vertical characteristic variable filter, image memory, horizontal characteristic variable filter and contour correction circuit; when vertical enlargement and horizontal reduction are selected, the processing proceeds sequentially through the horizontal characteristic variable filter, image memory, vertical characteristic variable filter and contour correction circuit; when the vertical enlargement and horizontal enlargement are selected, the processing proceeds sequentially through the contour correction circuit, image memory, horizontal characteristic variable filter and vertical characteristic variable filter.

With the arrangement described above, when the image enlargement processing or image reduction processing is selected, each with respect to both the horizontal and vertical directions, not only the appropriate contour correction can be accomplished but also it can be prevented that the contour correction effect becomes ineffective when the image enlargement processing in vertical direction is selected while the image reduction processing in horizontal direction is selected and vice versa.

Further, in the image processor according to the present invention, when the vertical reduction and horizontal reduction are selected by the selector groups, the processing proceeds sequentially through the horizontal characteristic variable filter, vertical characteristic variable filter, image memory and contour correction circuit; when vertical reduction and horizontal enlargement are selected, the processing proceeds sequentially through the contour correction circuit, vertical characteristic variable filter, image memory and horizontal characteristic variable filter; when vertical enlargement and horizontal reduction are selected, the processing proceeds sequentially through the contour correction circuit, horizontal characteristic variable filter, image memory and vertical characteristic variable filter; when vertical enlargement and horizontal enlargement are selected, the processing proceeds sequentially through the contour correction circuit, image memory, horizontal characteristic variable filter and vertical characteristic variable filter.

With the arrangement described above, when the image enlargement processing or image reduction processing is selected with respect to both the horizontal and vertical directions, not only appropriate contour correction can be accomplished but also unnecessary emphasizing can be prevented when image enlargement in horizontal direction is selected while image reduction in vertical direction is selected and vise versa.

Further, in the image processor according to the present invention, the contour correction circuit comprises a horizontal contour sampler for sampling the contour component in horizontal direction, a vertical contour sampler for sampling the contour component in vertical direction, a first adder for adding the contour component sampled by the horizontal contour sampler and the contour component sampled by the vertical contour sampler and a second adder for adding the contour component outputted from the first adder to the video signal to be inputted to the contour correction circuit to output the video signal corrected for contour.

With the arrangement described above, the contour can be corrected by sampling and adding the contour components in horizontal direction and vertical direction.

BRIEF DESCRIPTION OF THE DRAWINGS

FIG. 3 is a block diagram showing an example of the horizontal characteristic variable filter 16 given in FIG. 1.

FIG. 4 is an explanatory drawing for showing the operations of the selector groups 22 through 32 and decoder 36 given in FIG. 1.

FIG. 5 is an explanatory drawing for indicating the sequence of processings to be executed when "vertical reduction and horizontal reduction processing", "vertical reduction and horizontal enlargement processing", "vertical enlargement and horizontal reduction processing" and "vertical enlargement and horizontal enlargement processing" are selected respectively.

FIG. 7 is an explanatory drawing for comparing the frequency characteristic of (the image processor according to the present invention), in the case where the image enlargement processing (e.g., vertical enlargement and horizontal enlargement) is selected, with that of the conventional image processor (an example for comparison), wherein (A) represents the case of the present invention, while (B) represents the case of the conventional image processor.

FIG. 9 is an explanatory drawing showing the functions of the selector groups 22 through 32 and the decoder 36a given in FIG. 8.

FIG. 10 is an explanatory drawing showing the sequences of processings to be executed respectively when "vertical reduction and horizontal reduction", "vertical reduction and horizontal enlargement", "vertical enlargement and horizontal reduction" and "vertical enlargement and horizontal enlargement" are selected.

BEST MODE FOR CARRYING OUT THE INVENTION

The present invention will be described in detail in the following, referring to accompanying drawings.

Figure 1:
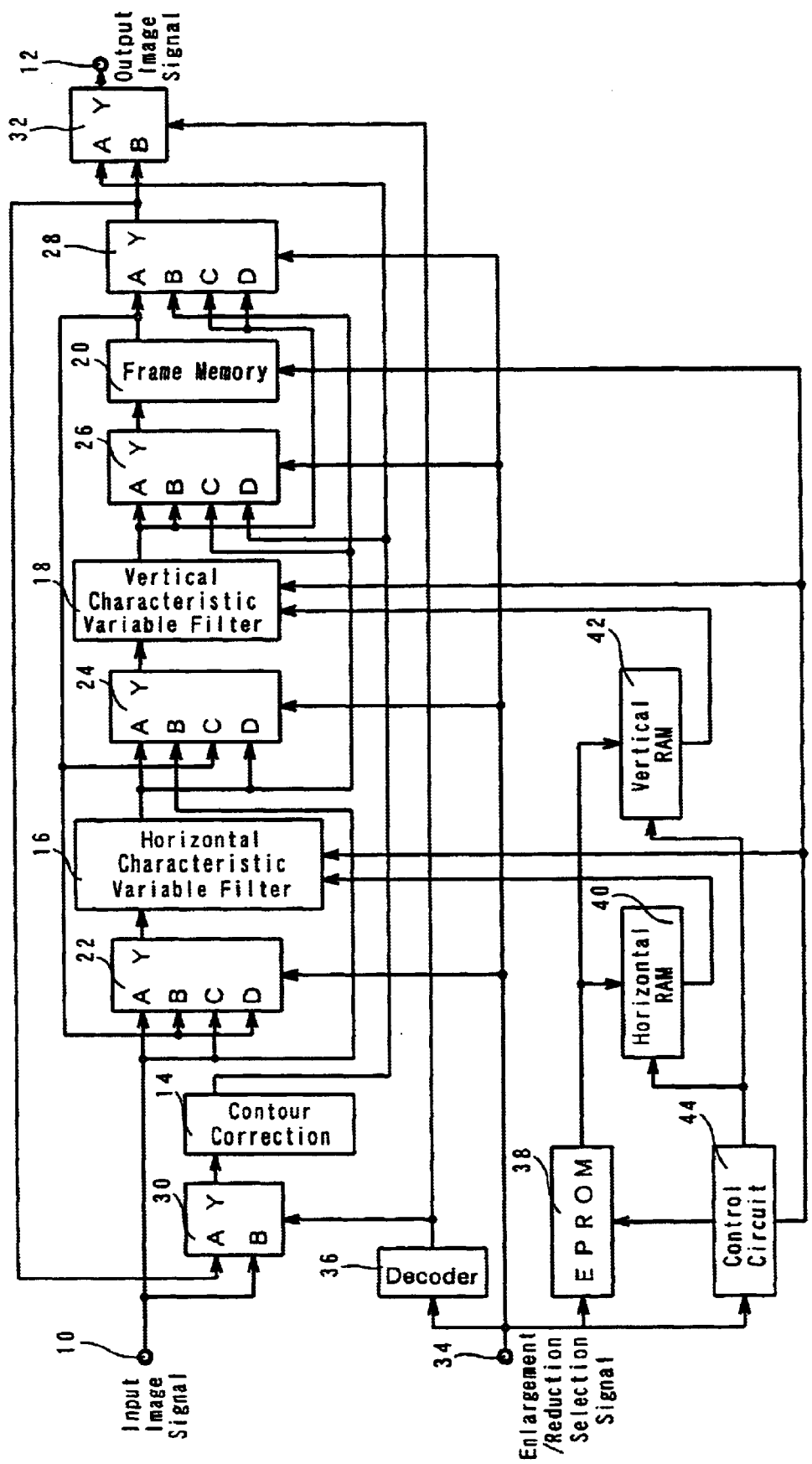
FIG. 1 is a block diagram showing an embodiment of the image processor according to the present invention.

FIG. 1 shows an embodiment of the present invention, wherein 10 represents a terminal for inputting digital video signal (hereinafter referred to simply as video signal) and 12, a terminal for outputting the video signal which has undergone image processing.

14 represents a contour correction circuit for contour correction processing; 16, a horizontal characteristic variable filter for executing the filter processing for corresponding one of the horizontal image enlargement and horizontal image reduction on the basis of the 2-bit enlargement/reduction selection signal, which will be described later; 18, a vertical characteristic variable filter for executing the filter processing for corresponding one of the vertical image enlargement and vertical image reduction on the basis of the enlargement/reduction selection signal; 20, a frame memory as an example of the image memory.

22, 24, 26 and 28 represent a first, a second, a third and a fourth selectors for selecting one of the four inputs, A, B, C and D, for Y-output according to the selection signal, which will be described later.

30 and 32 represent a fifth and a sixth selectors for selecting one of 2 outputs, A and B, for Y-output according to selection signal, which will be described later.

34 represents a terminal for inputting 2-bit enlargement/ reduction selection signal for selecting one of the image enlargement processing and image reduction processing in horizontal direction and vertical direction respectively; the image enlargement/reduction selection signal is input, as a selection signal like one shown in FIG. 4, to the first, second, third and fourth selectors, 22, 24, 26 and 28.

In other words, the first, second, third and fourth selectors, 22, 24, 26 and 38, selectively outputs one of the outputs, A, B, C and D, according to the enlargement/reduction selection signals, "00", "01", "10" and "11".

36 represents a decoder for decoding the enlargement/ reduction selection signal to output the decoded signal as selection signal to the fifth and sixth selectors 30 and 32 as shown in FIG. 4. In other words, the decoder 36 outputs L-level signal based on the enlargement/reduction selection signals "00", "01" and "10" and outputs H-level signal based on the enlargement/reduction signal "11". Further, the fifth and sixth selectors, 30 and 32, respectively selects, for output, A input and B input based on L-level and H-level signals.

38 represents an EPROM (Erasable Programmable Read Only Memory), and the EPROM 38 previously stores the coefficient data for image enlargement and image reduction, each with respect to horizontal direction and vertical direction.

40 represents a horizontal RAM (Random Access Memory) for the write-in and read-out of the coefficient data for both the image enlargement and image reduction in horizontal direction; 42, a vertical RAM for write-in and read-out of the coefficient data for image enlargement and image reduction in vertical direction; 44, a control circuit.

The control circuit 44 operates according to the enlargement/reduction selection signal inputted to the input terminal 34 and performs the following functions ① and ② according to a control program which is not shown in the drawings.

① Outputting address signal and R/W (Read/Write) signal, corresponding to PROM 38, horizontal RAM 40 and vertical RAM 42, according to the enlargement/reduction selection signals, "00", "01", "10" and "11" and reading from the EPROM 38 the coefficient data for "vertical reduction and horizontal reduction", "vertical reduction and horizontal enlargement", "vertical enlargement and horizontal reduction" and "vertical enlargement and horizontal enlargement" for output to the horizontal characteristic variable filter 16 and vertical characteristic variable filter 18 by way of the horizontal RAM 40 and vertical RAM 42.

② Outputting an enable signal to horizontal characteristic variable filter 16, vertical characteristic variable filter 18 and frame memory 20 according to the enlargement/ reduction selection signal "00" (i.e., vertical reduction and horizontal reduction).

Further, outputting an enabling signal to the vertical characteristic variable filter 18 according to the enlargement/ reduction selection signal "01" (vertical reduction and horizontal enlargement") and also outputting a read-enable signal to horizontal characteristic variable filter 16 and frame memory 20.

Further, outputting the enabling signal to the horizontal characteristic variable filter 16 and outputting a read-enabling signal to the vertical characteristic variable filter 18 and to the frame memory 20 according to the enlargement/ reduction signal "10" (vertical enlargement and horizontal reduction).

Further, outputting the read-enabling signal to the horizontal characteristic variable filter 16, vertical characteristic variable filter 18 and frame memory 20 according to enlargement/reduction selection signal "11" (vertical enlargement and horizontal enlargement).

Figure 2:
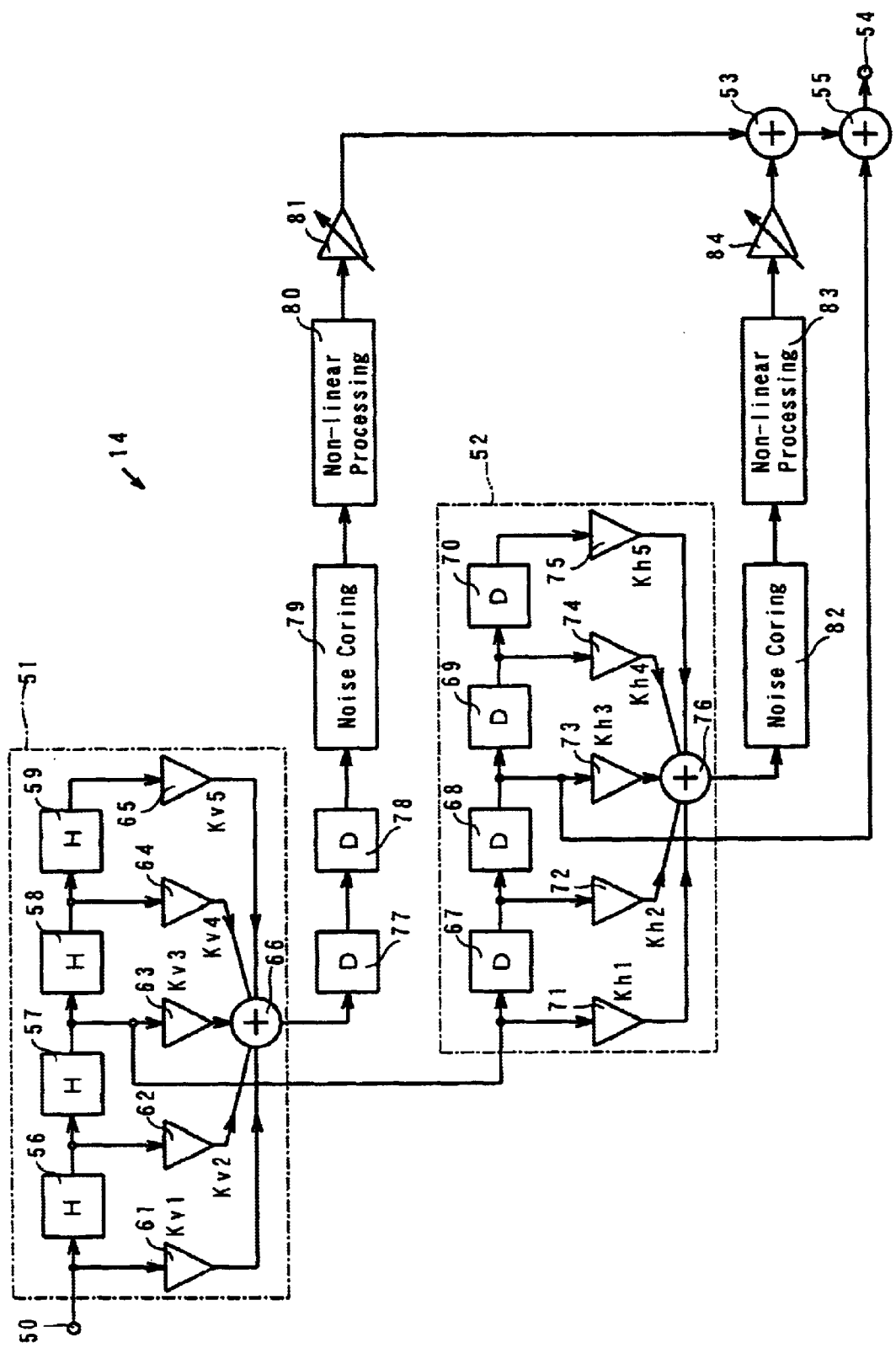
FIG. 2 is a block diagram showing an example of the contour correction circuit 14 given in FIG. 1.
Figure 6:
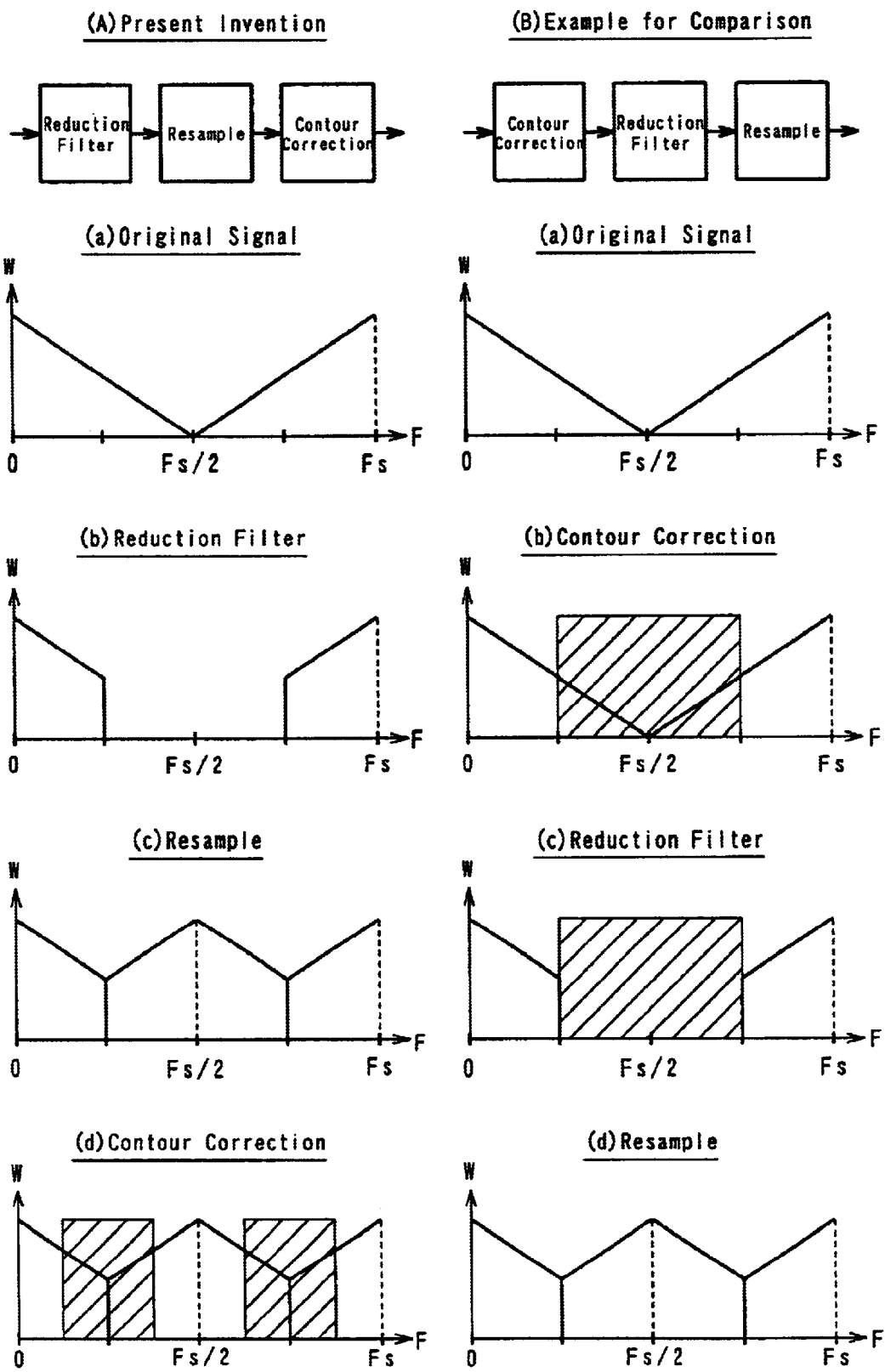
FIG. 6 is an explanatory drawing for comparing the frequency characteristic (of the image processor according to the present invention), in the case where the image reduction processing (e.g., "vertical reduction and horizontal reduction") is selected, with that of a conventional image processor (an example for comparison), wherein (A) represents the case of the present invention, while (B) represents the case of the conventional image processor (an example for comparison).

As shown in FIG. 2, the contour correction circuit 14 comprises a vertical contour sampler 51 for sampling the contour component in vertical direction from the video signal inputted to an input terminal 50, a horizontal contour component sampler 52 for sampling the contour component in horizontal direction from the inputted video signal, a first adder 53 for adding the contour component in vertical direction to the contour component in horizontal direction and a second adder 55 for adding the contour component outputted from the first adder to the inputted video signal for output to an output terminal 54.

The vertical contour sampler 51 comprises delayers 56, 57, 58 and 59 for sequentially delaying, for 1 line (1H), the video signal inputted to the input terminal 50, a multiplier 61 for multiplying the video signal inputted to the input terminal 50 by coefficient Kv1 for output, multipliers 62, 63, 64 and 65 for multiplying the output signals from the delayers 56, 57, 58 and 59 by coefficients Kv2, Kv3, Kv4 and Kv5 respectively for output and an adder 66 for adding the output signals from the multipliers 61 through 65.

The coefficients, Kv1, Kv2, Kv3, Kv4 and Kv5, are set, for example, to 0, −¼, ½, −¼ and 0 when the input video signal is one for interlace scanning, while the same are set to −¼, 0, ½, 0 and −¼ when the input video signal is one for non-interlace scanning.

The horizontal contour sampler 52 comprises delayers 67, 68, 69 and 70 for sequentially delaying for 1 dot (1D) the video signals outputted from the delayer 57 of the vertical contour sampler 51, a multiplier 71 for multiplying, for output, the video signal outputted from the delayer 57 by coefficient Kh1, multipliers 72, 73, 74 and 75 for multiplying the output signals from the delayers 67, 68, 69 and 70 by coefficients Kh2, Kh3, Kh4 and Kh5 respectively for output and an adder 76 for adding the output signals from the multipliers 71 through 75.

The coefficients Kh1, Kh2, Kh3, Kh4 and Kh5 are set, for example, to 0, −¼, ½, −¼ and 0 respectively when the input video signal is for interlace scanning, while the same are to −¼, 0, ½, 0, −¼ when the input signal is for non-interlace scanning.

Delayers 77 and 78 for sequentially delaying input signal for 1 dot (1D), a noise coring circuit 79, a non-linear contour correction circuit 80 and a vertical contour correction circuit 81 are interposed between the output side of the vertical contour sampler 51 and one of the input sides of the first adder 53.

A noise coring circuit 82, a non-linear processing circuit 83 and a horizontal contour correction circuit 84 are interposed between the output side of the horizontal contour sampler 52 and the other input side of the first adder 53.

As shown in FIG. 3, the horizontal characteristic variable filter 16 comprises delayers $86_1, 86_2, 86_3, \ldots 86_n$ with EN terminals for sequentially delaying for 1 dot the video signals inputted to the input terminal 85 for output, a multipliers $87_0, 87_1, 87_2, 87_3, \ldots 87_n$ for multiplying the video signal inputted to the input terminal 85 by coefficient data respectively for output and an adder 89 for adding the output signals from the multipliers $87_0, 87_1, 87_2, 87_3 \ldots 87_n$ for output to an output terminal 88.

The delayers $86_1, 86_2, 86_3 \ldots 86_n$ are, for example, D-type flip-flop's, each with EN terminal, and the enabling signal (read-enabling signal for enlargement and enabling signal for reduction) is input to the EN terminal from the control circuit 44. The coefficient data for horizontal enlargement and horizontal reduction read out from the EPROM 38 and horizontal RAM 40 by the function ② of the control circuit 44 are input to the multipliers $87_0$, $87_1$, $87_2$, $87_3$, . . . $87_n$.

The vertical characteristic variable filter 18 has a composition similar to that of the horizontal characteristic variable filter 16 except that the delayers $86_1$, $86_2$, $86_3$, . . . $86_n$ are respectively replaced with those capable of sequentially delaying the video signals for 1 line for output. More particularly, the enabling signal (read-enable signal for enlargement and enabling signal for reduction) is input to each EN terminal of each delayer for the 1-line delay, while the coefficient data for vertical enlargement and vertical reduction, read out from the EPROM 38 and RAM 42 by the function ② of the control circuit 44, are inputted to the multipliers respectively connected to the output sides of the delayers for 1-line delay.

Next, the operation of the embodiment shown in FIG. 1 will be described referring to FIGS. 2 through 7.

First, in the following section (1), it will be explained that either the horizontal characteristic variable filter 16 or vertical characteristic variable filter 18 performs corresponding filter processing for image enlargement or image reduction according to the 2-bit enlargement/reduction selection signal inputted to input terminal 34; in section (2), the operations of the selector groups 22, 24, 26, 28, 30 and 32 according to the enlargement/reduction selection signal will be explained; in section (3), the sequence of processing for each of "vertical reduction and horizontal reduction", "vertical reduction and horizontal enlargement", "vertical enlargement and horizontal reduction" and "vertical enlargement and horizontal enlargement" will be explained; in section (4), the specific operation of the contour correction circuit will be explained.

(1) Operation of Characteristic Variable Filters 16 and 18

(i) Responding to the enlargement/reduction selection signals, "00", "01", "10" and "11", the coefficient data for "vertical reduction and horizontal reduction", "vertical reduction and horizontal enlargement", "vertical enlargement and horizontal reduction" and "vertical enlargement and horizontal enlargement" are read out from the EPROM 38 by the function (1) of the control circuit 44 and are inputted to the horizontal characteristic variable filter 16 and the vertical characteristic variable filter 18 by way of the horizontal RAM 40 and vertical RAM 42.

More particularly, as shown in FIG. 3, for the operation of the horizontal characteristic variable filter 16, the coefficient data for horizontal enlargement or horizontal reduction read out from the EPROM 38 and the horizontal RAM 40 is inputted to the multipliers $87_0$, $87_1$, $87_2$, $87_3$, . . . $87_n$ respectively. The same applies to the vertical characteristic variable filter 18.

(ii) The enable signals corresponding to the horizontal characteristic variable filter 16 and the vertical characteristic variable filter 18 are inputted by the function ② of the control circuit 44 responding to the enlargement/reduction selection signals "00", "01", "10" and "11".

More particularly, as shown in FIG. 3, for the operation of the horizontal characteristic variable filter 16, the read enabling signal is inputted to the EN terminal of each of the delayers $86_1$, $86_2$, $86_3$, . . . $86_n$ when the horizontal enlargement processing is selected, while the enabling signal is inputted when the horizontal reduction processing is selected. The same applies to the vertical characteristic variable filter 18.

(iii) Therefore, when the enlargement/reduction selection signal is "01" or "11" (i.e., when the first bit is 1), the horizontal characteristic variable filter 16 executes the filter processing for horizontal enlargement according to the coefficient data for horizontal enlargement and the inputted read-enabling signal, while the horizontal characteristic variable filter 16 executes the filter processing for horizontal reduction according to the coefficient data for horizontal reduction and inputted enabling signal when the enlargement/reduction selection signal is "00" or "10" (i.e., when the second bit is 0).

Similarly, when the enlargement/reduction selection signal is "10" or "11" (i.e., when the second bit is 1), the vertical characteristic variable filter 18 executes the filter processing for vertical enlargement according to the coefficient data for vertical enlargement and the inputted read-enabling signal, while the vertical characteristic variable filter 18 executes the filter processing for vertical reduction according to the coefficient data for vertical reduction and the inputted enabling signal.

(2) Operations of Selector Groups 22 through 32

The first, second, third and fourth selectors, 22, 24, 26 and 28, select the inputs, A, B, C and D, respectively according to the enlargement/reduction selection signals, "00", "01", "10" and "11".

Decoder 36 outputs the L-level signal according to the enlargement/reduction selection signals, "00", "01" and "10", while outputting H-level signal according to the enlargement/reduction selection signal "11", so that the fifth and sixth selectors, 30 and 32, select A-input according to the enlargement/reduction selection signal, "00", "01" and "10", while selecting B-input according to the enlargement/reduction selection signal "11".

(3) Order of Various Processings

When "vertical reduction and horizontal reduction", "vertical reduction and horizontal enlargement", "vertical enlargement and horizontal reduction" or "vertical enlargement and horizontal enlargement" is selected by the operations described in sections (1) and (2), the processing of the video signal inputted to the input terminal 10 by the contour correction circuit 14, horizontal characteristic variable filter 16, vertical characteristic variable filter 18 and frame memory 20 is executed in the order described in the following sub-sections (a), (b), (c) and (d), the details of which is given below respectively.

(a) When Vertical Reduction and Horizontal Reduction are Selected:

(i) When the enlargement/reduction selection signal is "00", the video signal inputted to the input terminal 10 is inputted, for processing, to the horizontal characteristic variable filter 16 by way of the A-input and Y-output of the first selector 22, and this is followed by the input, for processing, to the vertical characteristic variable filter 18 by way of the A-input and Y-output of the second selector 24, the input, for re-sampling, to the frame memory 20 by way of the A-input and Y-output of the third selector 26, the input, for processing, to the contour correction circuit 14 by way of the A-input and Y-output of the fourth selector 28 and the A-input and Y-output of the fifth selector 30 and the output to the output terminal 12 by way of the A-input and Y-output of the sixth selector 32.

(ii) As explained in the section (1), when enlargement/reduction selection signal is "00", not only the horizontal characteristic variable filter functions as the horizontal reduction filter but also the vertical characteristic variable filter functions as the vertical reduction filter.

Therefore, as shown in FIG. 5(a), the video signal inputted to the input terminal 10 undergoes the horizontal reduction processing by the horizontal characteristic variable filter 16 and the vertical reduction processing by the vertical characteristic variable filter 18, and this is followed by the sampling by the frame memory 20 and the contour correction by the contour correction circuit 14.

Thus, as shown in FIG. 6(A), the image reduction processing is followed by re-sampling and contour correction, meaning that the band of high-pass frequency component will not be restricted emphasized by the contour correction in the stage of the image reduction processing unlike the conventional case where the contour correction is made after the image reduction processing (Refer to the case of FIG. 6(B)).

In other words, when the frequency characteristic of the original signal (inputted video signal) sampled at frequency Fs is as shown in FIG. 6(A)(a), the band of frequency is limited by reduction filter as shown in FIG. 6(A)(b), and this is followed by the re-sampling processing (thinning processing) at frequency Fs/2 as shown in FIG. 6(A)(c) and contour correction as shown in FIG. 6(A)(d).

With this contour correction, the high-pass component is emphasized to produce contour correction effect as represented by the hatched areas in FIG. 6(A)(d).

In contrast, as shown in FIG. 6(B), in the case for comparison where the image reduction processing is executed after the contour correction, the high-pass frequency component is emphasized as represented by the hatched area in FIG. 6(B)(b); the high-pass frequency component is limited with respect to frequency band by reduction filter as shown in FIG. 6(B)(c) and is then re-sampled (thinning processing) at frequency Fs/2, and, as a result, the contour correction becomes ineffective as shown in FIG. 6(B)(d).

(b) When Vertical Reduction and Horizontal Enlargement is Selected:

(i) When the enlargement/reduction selection signal is "01", the video signal inputted to the input terminal 10 is input, for processing, to the vertical characteristic variable filter 18 by way of the B-input and Y-output of the second selector 24, and this is followed by the input, for re-sampling, to the frame memory 20 by way of B-input and Y-output of the third selector 26, the input, for processing, to the horizontal characteristic filter 16 by way of B-input and Y-output of the first selector 22, input, for processing to the contour correction circuit 14 by way of B-input and Y-output of the fourth selector 28 and A-input and Y-output of the fifth selector 30, and the output to the output terminal 12 by way of A-input and Y-output of the sixth selector 32.

(ii) As discussed in the previous section (1), when the enlargement/reduction selection signal is "01", not only the horizontal characteristic variable filter 16 functions as a horizontal enlargement filter but also the vertical characteristic variable filter 18 functions as a vertical reduction filter.

Therefore, as shown in FIG. 5(b), the video signal inputted to the input terminal 10 undergoes the vertical reduction processing by vertical characteristic variable filter 18, re-sampling by the frame memory 20, horizontal enlargement processing by the horizontal characteristic variable filter 16 and the contour correction processing by the contour correction circuit 14.

Thus, the contour correction effect, similar to that in the case given in (a), can be obtained without fear of getting the contour correction effect lost like in the case of the conventional system.

(c) When Vertical Enlargement and Horizontal Reduction are Selected:

(i) When the enlargement/reduction selection signal is "10", the video signal inputted to the input terminal 10 is inputted, for processing, to the horizontal characteristic variable filter 16 by way of C-input and Y-output of the first selector 22, followed by the input, for re-sampling, to the frame memory 20 by way of the C-input and Y-output of the third selector 26, the input, for processing, to the vertical characteristic variable filter 18 by way of C-input and Y-output of the second selector 24, the input, for processing, to the contour correction circuit 14 by way of C-input and Y-output of the fourth selector 28 and A-input and Y-output of the fifth selector 30, and the output to the output terminal 12 by way of A-input and Y-output of the sixth selector 32.

(ii) When the enlargement/reduction selection signal is "10", as described in (1), not only the vertical characteristic variable filter 18 functions as a vertical enlargement filter but also the horizontal characteristic variable filter 16 functions as a horizontal reduction filter.

Therefore, as shown in FIG. 5(c), the video signal inputted to the input terminal 10 undergoes the horizontal reduction filter processing by the horizontal characteristic variable filter 16, re-sampling by the frame memory 20 and vertical enlargement filter processing by the vertical characteristic variable filter 18 and the contour correction by the contour correction circuit 14.

Thus, the contour correction effect similar to that in the case of (a) can be obtained, without causing the contour correction effect to be lost like in the case of the conventional system.

(d) When Vertical Enlargement and Horizontal Enlargement are Selected:

(i) When the enlargement/reduction selection signal is "11", the video signal inputted to the input terminal 10 is input, for processing, to the contour correction circuit 14 by way of B-input and Y-output of the fifth selector 30, followed by the input, for re-sampling, to the frame memory 20 by way of D-input and Y-output of the third selector 26, the input, for processing, to the horizontal characteristic variable filter 16 by way of D-input and Y-output of the first selector 22, the input, for processing, to the vertical characteristic variable filter 18 by way of D-input and Y-output of the second selector 24, and the output to the output terminal 12 by way of D-input and Y-output of the fourth selector 28.

(ii) When the enlargement/reduction selection signal is "11", as described in (1), the vertical characteristic variable filter 18 functions as a vertical enlargement filter, while the horizontal characteristic variable filter 16 functions as a horizontal enlargement filter.

Therefore, as indicated in FIG. 5(d), the video signal, inputted to the input terminal 10, undergoes the contour correction by the contour correction circuit 14, followed by the re-sampling by the frame memory 20, horizontal enlargement filter processing by the horizontal characteristic variable filter 16, and vertical enlargement filter processing by the vertical characteristic variable filter 18.

Thus, as shown in FIG. 7 (A), appropriate contour correction can be obtained following (initial) contour correction, the re-sampling and subsequent image enlargement processing.

In contrast, in the case of the conventional system, wherein the contour correction is made after the image enlargement processing, it results that the portion not requiring any emphasis is emphasized as shown in FIG. 7(B).

More particularly, when the frequency characteristic of the original signal (input video signal) sampled at frequency Fs is similar to that shown in FIG. 6(A)(a), the frequency characteristic of the signal, which has undergone contour correction by the contour correction circuit 14, becomes as shown in FIG. 7(A)(a), that is, the image enlargement processing is executed as shown in FIG. 7(A)(b) after the interpolation processing by the frame memory 20 at the frequency Fs. Therefore, as shown in FIG. 7(B), the portion of contour not requiring emphasis can be prevented from being emphasized.

In contrast, in the case of the example for comparison, the contour correction is made following the interpolation processing by the frame memory 20 at frequency Fs and the image enlarging processing as indicated in FIG. 7(B)(a), causing unnecessary emphasizing of the contour portion not requiring emphasizing.

(4) Operation of Contour Correction Circuit 14

(i) Vertical contour sampler 51 samples the contour component in vertical direction from the video signal inputted to input terminal 50 by the operation of delayers 56, 57, 58 and 59, multipliers 61, 62, 63, 64 and 65 and adder 66.

Horizontal contour sampler 52 samples the contour component in horizontal direction from the video signal inputted to the input terminal 50 by the operation of the delayers 67, 68, 69 and 70, the multipliers 71, 72, 73, 74 and 75 and the adder 76.

(ii) The contour component sampled by the vertical contour sampler 51 is delayed sequentially by 1 dot through the delayers 77 and 78, followed by the removal of noise component by having the components, whose levels are lower than set level (e.g., 7), removed by noise (coring) circuit 79, the non-linear processing by non-linear processing circuit 80, the correction of vertical contour emphasis by vertical contour correction circuit 81 and the subsequent input to one input side of the first adder 53.

The non-linear processing by non-linear processing circuit 80 means the processing designed for applying the limiter to prevent unnatural image from being produced by sampling the vertical contour component of (high) level, further, for example, meaning the processing wherein the absolute value of the amplitude of the contour component is suppressed within the range where the absolute value is higher than the set value S (e.g. suppression to a fixed value), while being emphasized within the range where the absolute value is lower than the set value S (e.g., emphasizing according to the linear characteristic of a coefficient larger than 1).

(iii) For the contour component sampled by the horizontal contour sampler 52, the component lower than the set level (e.g. ,7) is suppressed by the noise (coring) circuit 82 to have its noise component removed, followed by the non-linear processing by the non-linear processing circuit 83, the correction of horizontal contour emphasis by the non-linear processing circuit 83 and the input to the other input side of the first adder 53. The non-linear processing by the non-linear processing circuit 83 is substantially similar to the nonlinear processing by the non-linear processing circuit 80.

(iv) The composite contour component obtained by the first adder 53 is added to the video signal by the second adder 55 and is outputted from output terminal 54. The video signal, corrected for contour and to be outputted from the output terminal 54, becomes D-input of the third selector 26 and A-input of the sixth selector 32.

The description of the above embodiment is concerned with the case where, in order to enable the contour correction in both horizontal and vertical directions, the contour correction circuit is composed of the horizontal contour sampler, vertical contour sampler, the first adder and the second adder, but the present invention is not limited to such an embodiment and is also applicable to the image processor, wherein the contour correction circuit comprises either the horizontal contour sampler or vertical contour sampler and the adder in order to execute the contour correction in either one of horizontal direction or vertical direction.

The above embodiment is designed so that, when one of the horizontal direction and vertical direction is related to image enlargement processing while the other is related to image reduction processing, in order to prevent the contour correction effect from becoming ineffective as the result of the image reduction processing by the selector groups, the processing is set to proceed sequentially through the stages of vertical characteristic variable filter, image memory, horizontal characteristic variable filter and contour correction circuit; when the enlargement/reduction selection signal is for vertical enlargement and horizontal reduction, the processing is set to proceed sequentially through the stages of the horizontal characteristic variable filter, image memory, vertical characteristic variable filter and contour correction circuit, but the present invention is not limited to this arrangement.

For instance, where (the image processor) is arranged so that, when the enlargement/reduction selection signal for vertical reduction and horizontal enlargement is selected by the selector groups, the processing is set to proceed sequentially through the stages of the contour correction circuit, vertical characteristic variable filter, image memory and horizontal characteristic variable filter, while, when the enlargement/reduction selection signal for vertical enlargement and horizontal reduction is selected, the processing is set to proceed sequentially through the stages of the contour correction circuit, horizontal characteristic variable filter, image memory and vertical characteristic variable filter, the system can be arranged so that, when one of the horizontal direction and vertical direction is related to image enlargement processing while the other is related to image reduction processing, the portion of the contour not requiring emphasis is prevented from being emphasized.

Figure 8:
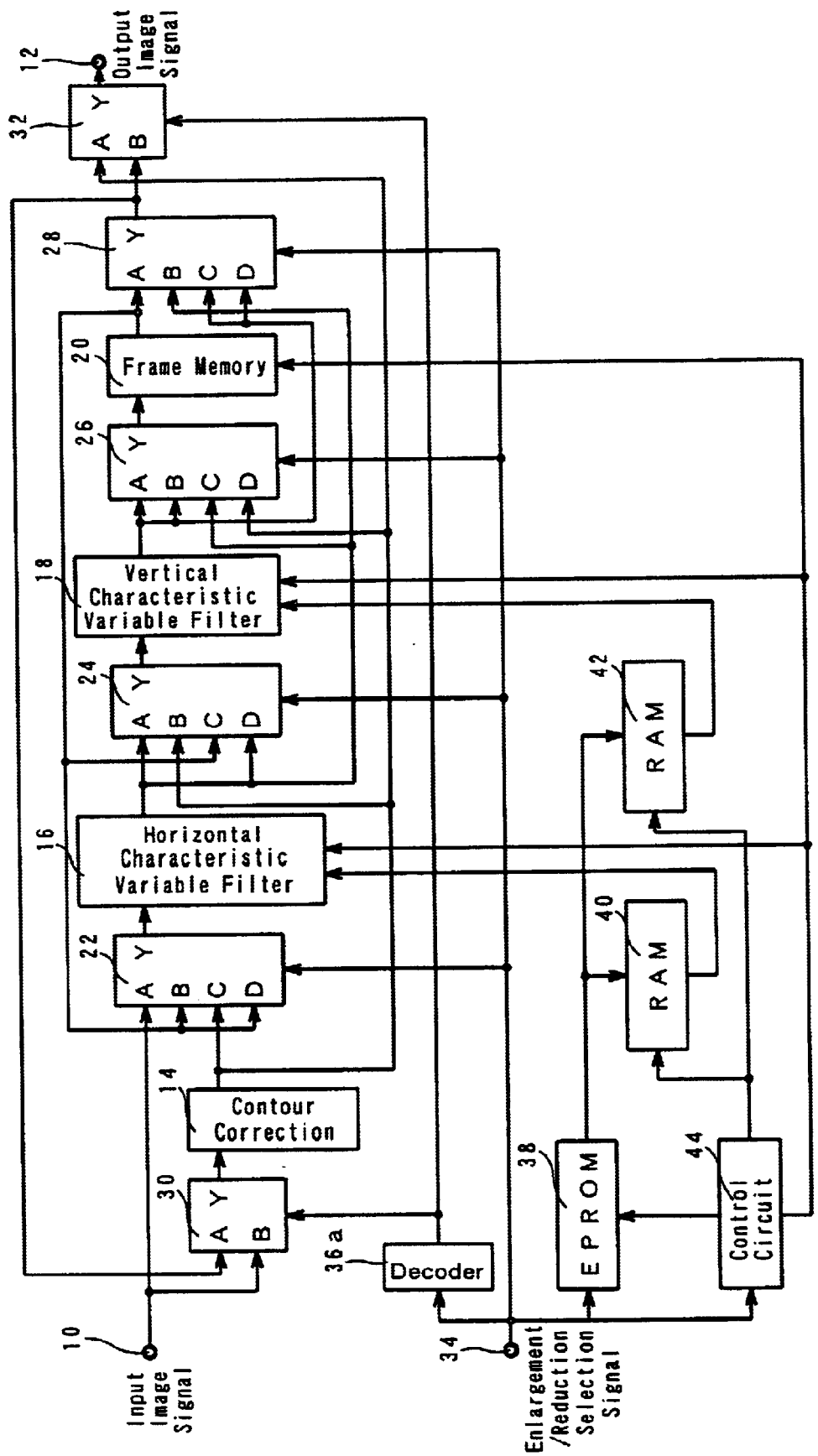
FIG. 8 is a block diagram showing another embodiment of the present invention.

More particularly, when "vertical reduction and horizontal reduction", "vertical reduction and horizontal enlargement", "vertical enlargement and horizontal reduction" and "vertical enlargement and horizontal enlargement" are selected according to the enlargement/reduction selection signals "00", "10" and "11", the sequence of processing of the video signal inputted to the input terminal 10 in the stages of the contour correction circuit 14, horizontal characteristic variable filter 16, vertical characteristic variable filter 18 and frame memory 20 can be set as given in FIG. 10(a), (b), (c) and (d), by altering C-input of the first selector 22 and B-input of the second selector as shown in FIG. 8 and by altering the function of the decoder 36a as given in FIG. 9.

With the arrangement described above, when the vertical reduction and horizontal enlargement or vertical enlargement and horizontal reduction is selected, the horizontal enlargement processing or vertical enlargement processing is executed after the contour correction, whereby it can be made possible that the portion (of the contour) not requiring emphasis is prevented from being emphasized in the image enlargement processing.

For the above embodiment, explanation is made as to the case where the characteristic variable filter comprises the horizontal characteristic variable filter and vertical characteristic variable filter so that both the image enlargement processing and image reduction processing can be related to either one of the horizontal direction and vertical direction respectively, but the present invention is not limited to this case, since the present invention is also applicable to the case where the characteristic variable filter comprises either one of the horizontal characteristic variable filter and vertical characteristic variable filter. In this case, not only the composition of the selector group but also the control of the coefficient read-out controller can be simplified.

INDUSTRIAL APPLICABILITY

As described in the foregoing, the present invention provides an image processor capable of executing either one or both of the image enlargement processing and image reduction processing, as well as the execution of the contour correction processing, and is also capable of effecting appropriate contour correction, regardless of whether the image enlargement processing or image reduction processing is selected.

What is claimed is:

1. An image processor, comprising: a coefficient memory for storing coefficient data for image enlargement and image reduction; a coefficient read-out controller for reading out corresponding coefficient data from the coefficient memory according to an enlargement/reduction selection signal; a characteristic variable filter for executing filter processing corresponding to either image enlargement processing or image reduction processing according to the coefficient data read out by the coefficient read-out controller; an image memory; a contour correction circuit; and selector groups provided in preceding stage and subsequent stage of each characteristic variable filter and image memory respectively and connected to one another, wherein the selector groups set the processing of an inputted video signal to proceed sequentially through the contour correction circuit, image memory and characteristic variable filter when the enlargement/reduction selection signal is for image enlargement processing and the processing of the inputted video signal is set to proceed sequentially through the characteristic variable filter, image memory and contour correction circuit when the enlargement/reduction selection signal is for image reduction processing.

2. The image processor according to claim 1, wherein the coefficient memory previously stores the coefficient data for image enlargement and image reduction, each related with a horizontal direction or a vertical direction; the coefficient read-out controller reads out from the coefficient memory the corresponding coefficient data according to the enlargement/reduction selection signal for selecting either image enlargement or image reduction, each related with either the horizontal direction or vertical direction; the characteristic variable filter comprises a horizontal characteristic variable filter for executing either filter processing for image enlargement or image reduction and a vertical characteristic variable filter for vertical image enlargement or reduction.

3. An image processor comprising: a coefficient memory for storing coefficient data for image enlargement and image reduction, each related with a horizontal direction or a vertical direction; a coefficient read-out controller for reading out corresponding coefficient data from the coefficient memory according to an enlargement/reduction selection signal and selecting either image enlargement or image reduction, each related with either the horizontal direction or vertical direction; a characteristic variable filter for executing filter processing corresponding to either image enlargement processing or image reduction processing according to the coefficient data read out by the coefficient read-out controller, the characteristic variable filter comprising a horizontal characteristic variable filter for executing either filter processing for horizontal image enlargement or image reduction and a vertical characteristic variable filter for vertical image enlargement or image reduction; an image memory; a contour correction circuit; and selector groups provided in a preceding stage and subsequent stage of each characteristic variable filter and image memory respectively and connected to one another, wherein when the enlargement/reduction selection signal for vertical reduction and horizontal reduction is selected by the selector groups, the processing is set to proceed sequentially through the horizontal characteristic variable filter, the vertical characteristic variable filter, the image memory and the contour correction circuit; when the enlargement/reduction signal is for vertical reduction and horizontal enlargement, the processing is set to proceed sequentially through the vertical characteristic variable filter, image memory, horizontal characteristic variable filter and the contour correction circuit; when the enlargement/reduction selection signal is for vertical enlargement and horizontal reduction, the processing is set to proceed sequentially through the horizontal characteristic variable filter, the image memory, the vertical characteristic variable filter and the contour correction circuit; and when the enlargement/reduction selection signal is for vertical enlargement and horizontal enlargement, the processing is set to proceed sequentially through the contour correction circuit, the image memory, the horizontal characteristic variable filter and the vertical characteristic variable filter.

4. An image processor comprising: a coefficient memory for storing coefficient data for image enlargement and image reduction, each related with a horizontal direction or a vertical direction; a coefficient read-out controller for reading out corresponding coefficient data from the coefficient memory according to an enlargement/reduction selection signal and selecting either image enlargement or image reduction, each related with either the horizontal direction or vertical direction; a characteristic variable filter for executing filter processing corresponding to either image enlargement processing or image reduction processing according to the coefficient data read out by the coefficient read-out controller, the characteristic variable filter comprising a horizontal characteristic variable filter for executing either filter processing for horizontal image enlargement or image reduction and a vertical characteristic variable filter for vertical image enlargement or image reduction; an image memory; a contour correction circuit; and selector groups provided in a preceding stage and subsequent stage of each characteristic variable filter and image memory respectively and connected to one another, wherein when the enlargement/reduction selection signal for vertical reduction and horizontal reduction is selected by the selector groups, the processing is set to proceed sequentially through the horizontal characteristic variable filter, the vertical characteristic variable filter, the image memory and the contour correction circuit; when the enlargement/reduction selection signal is for vertical reduction and horizontal enlargement, the processing is set to proceed sequentially through the contour correction circuit, the vertical characteristic variable filter, the image memory and the horizontal characteristic variable filter; when the enlargement/reduction selection signal is for vertical enlargement and horizontal reduction, the processing is set to proceed sequentially through the contour correction circuit, the horizontal characteristic variable filter, the image memory and the vertical characteristic variable filter; and when the enlargement reduction selection signal is for vertical enlargement and horizontal enlargement, the processing is set to proceed sequentially through the contour correction circuit, the image memory, the horizontal characteristic variable filter and the vertical characteristic variable filter.

5. An image processor comprising: a coefficient memory for storing coefficient data for image enlargement and image reduction; a correction read-out controller for reading out corresponding coefficient data from the coefficient memory according to an enlargement/reduction selection signal; a characteristic variable filter for executing filter processing corresponding to either image enlargement processing or image reduction processing according to the coefficient data read out by the coefficient read-out controller; an image memory; a contour correction circuit comprising a horizontal contour sampler for sampling a contour component in a horizontal direction, a vertical contour sampler for sampling a contour component in a vertical direction, a first adder for adding the contour component sampled by the horizontal contour sampler to the contour component sampled by the vertical contour sampler and a second adder for adding a contour component outputted from the first adder to image data to be inputted to the contour correction circuit for outputting image data corrected for contour; and selector groups provided in a preceding stage and subsequent stage of each characteristic variable filter and image memory respectively and connected to one another, wherein the selector groups set the processing of an inputted video signal to proceed sequentially through the contour correction circuit, image memory and characteristic variable filter when the enlargement/reduction selection signal is for image enlargement processing and the processing of the inputted video signal is set to proceed sequentially through the characteristic variable filter, image memory and contour correction circuit when the enlargement/reduction selection signal is for image reduction processing.

* * * * *